No. 743,754. PATENTED NOV. 10, 1903.
F. ROHR.
FRUIT PICKER.
APPLICATION FILED NOV. 24, 1902.
NO MODEL.
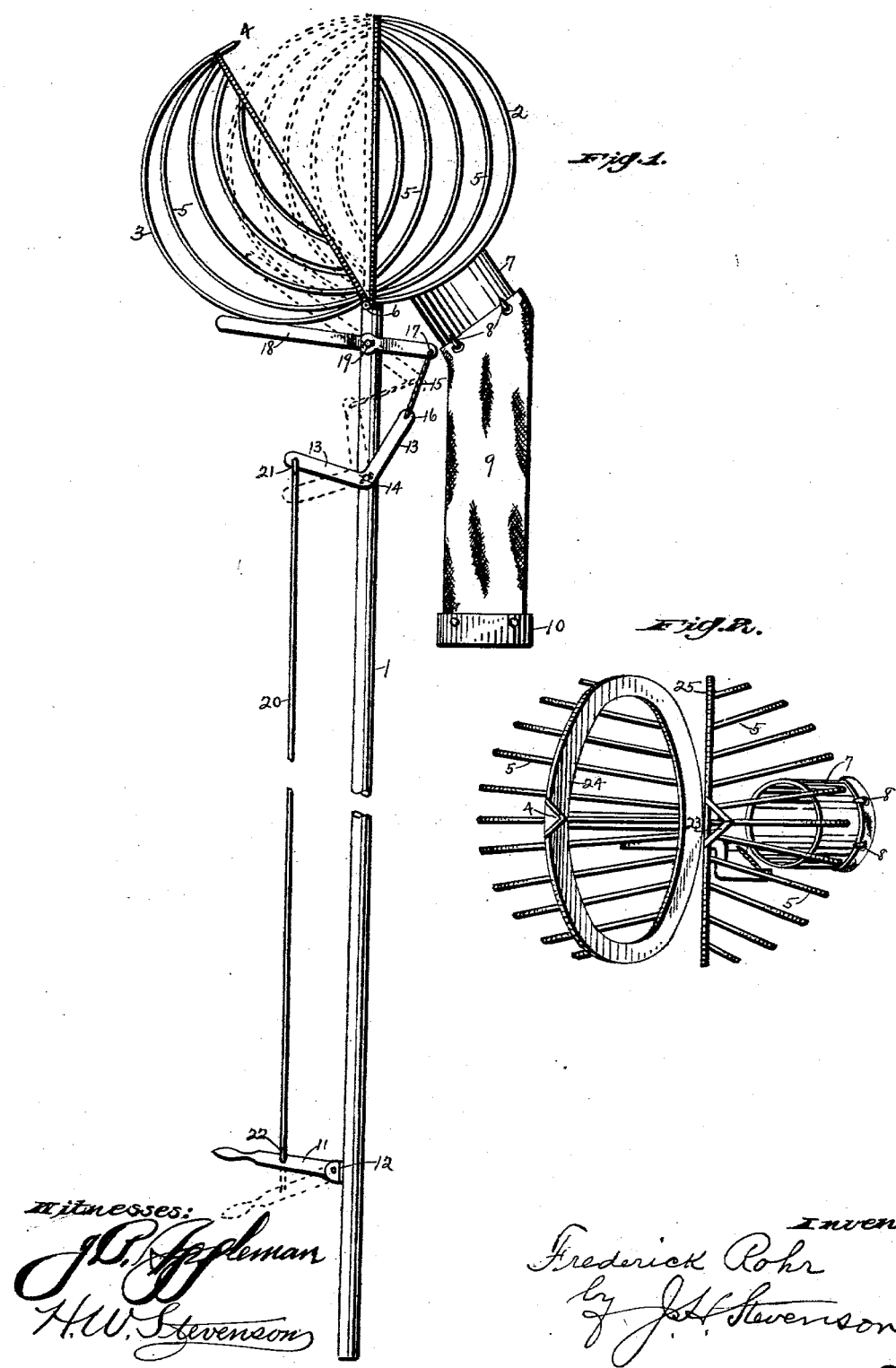

No. 743,754. Patented November 10, 1903.

UNITED STATES PATENT OFFICE.

FREDERICK ROHR, OF IRWIN, PENNSYLVANIA.

FRUIT-PICKER.

SPECIFICATION forming part of Letters Patent No. 743,754, dated November 10, 1903.

Application filed November 24, 1902. Serial No. 132,704. (No model.)

*To all whom it may concern:*

Be it known that I, FREDERICK ROHR, a citizen of the Empire of Germany, residing at Irwin, in the county of Westmoreland and State of Pennsylvania, have invented certain new and useful Improvements in Fruit-Pickers; and I do hereby declare the following to be a full, clear, and exact description thereof, reference being had to the accompanying drawings, which form a part of this specification.

The object of my invention is a hand fruit-picker whereby such fruits as apples, pears, peaches, &c., may be picked by a person standing on the ground without bruising or injuring the same and without the use of ladders.

In the accompanying drawings, forming a part of this specification, Figure 1 is a plan view of my fruit-picker opened ready for use. Fig. 2 is a top view of the same.

The numeral 1 designates the handle of my fruit-picker.

2 is the half of the basket into which the fruit drops after being detached from the tree and is rigidly fixed to the top of the handle. 3 is the other half of the basket, pivoted to the top of the handle at 6.

4 is a knife formed on the swinging part of the basket 3 for the purpose of cutting the stem of the fruit.

5 5 are ribs forming the basket 2 3, in connection with the rings 24 25, to which these ribs are rigidly fixed.

7 is a section of tin pipe rigidly fixed to the stationary part of the basket 2 and so constructed as to afford an attachment of a poke or bag 9 by use of hooks 8 8.

10 is a swinging bottom to the bag 9. This bottom 10 is closed by buttons or hooks.

11 is an operating-lever pivoted to the handle at 12.

13 13 is a double-acting lever pivoted to the handle at 14.

15 is a connecting-link between the levers 13 and 18, being joined to the same at 16 and 17. The lever 18 is pivoted to the handle at 19. This latter lever 18 also forms a rest for the swinging section 3 of the basket.

20 is a wire rod connecting lever 11 to lever 13 at 21 and 22, respectively.

23 is a recess formed in the section 2 of the basket, into which the knife 4 enters while cutting the fruit-stem.

The rings 24 and 25 will be formed of some strong metallic substance—such as iron, steel, &c.—and to these rings all the ribs 5 5 will be secured, so as to form a basket of sufficient strength for the work to be performed.

In operation of my fruit-picker, the basket being open, as seen in Fig. 1, the operator raises it to the fruit, manipulates it so that the stem will lodge in the recess 23, then by simply pulling the lever 11 downward the lever 13 is thus drawn down, which in turn pulls the lever 18 down and throws the swinging section of the basket into position, as shown by dotted lines, where the knife 4 will enter the recess 23 and sever the stem of the fruit. The fruit being thus cut off will fall to the lower part of the basket and will then roll into the tin pipe leading into the bag or poke 9. The swinging section 3 of the basket will then of its own weight fall open ready for further use.

Having thus fully shown and described my invention, what I claim as new, and desire to secure by Letters Patent, is—

A fruit-picker consisting of a staff, a rigid basket-section secured to the shaft, a receptacle communicating therewith, a pivoted basket-section mounted on the shaft, a straight lever pivoted to the staff and having one end engaging said pivoted section, an angle-lever pivoted on the staff and having one end connected with said straight lever, and a hand-lever pivoted to the staff and connected with the other end of said angle-lever for operating the same.

In testimony whereof I have hereunto affixed my signature in the presence of two subscribing witnesses.

FREDERICK ROHR.

Witnesses:
ANDRE CERVENSKY,
HALL SMITH.